Figure 1:
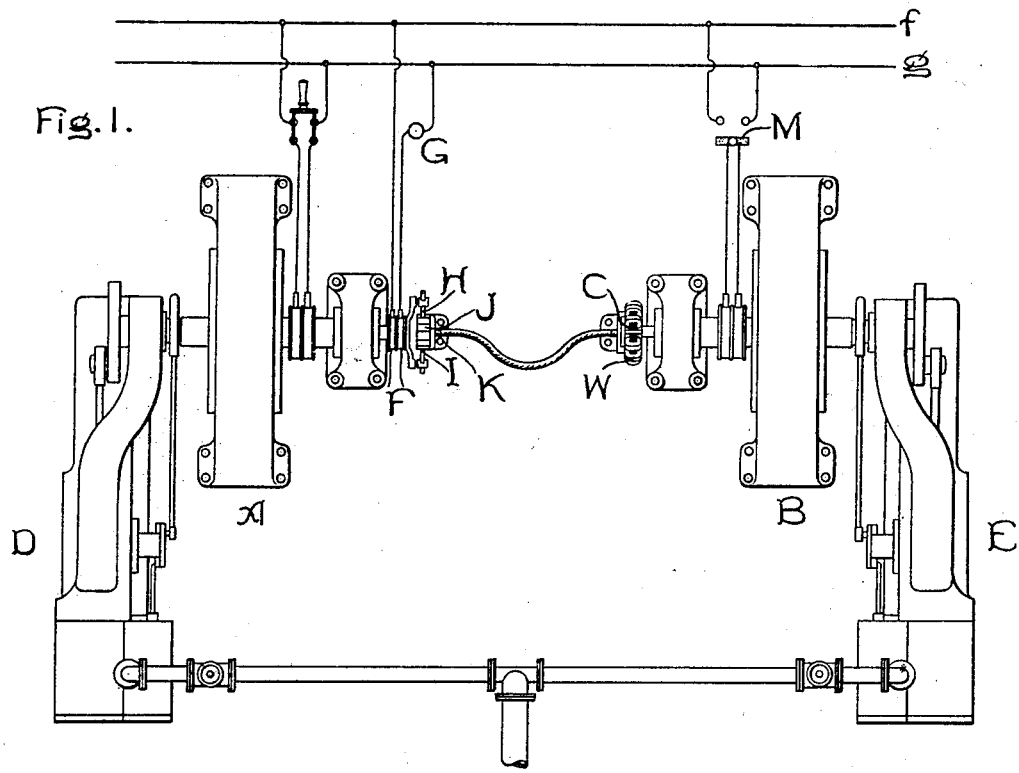

No. 731,992. PATENTED JUNE 23, 1903.
H. W. BUCK.
METHOD OF INDICATING THE RELATIVE POSITIONS OF MOVING PARTS.
APPLICATION FILED APR. 3, 1902.
NO MODEL.

Witnesses:
George A. Thornton
Helen Orford

Inventor:
Harold W. Buck,
by Albert G. Davis
Att'y.

No. 731,992. Patented June 23, 1903.

UNITED STATES PATENT OFFICE.

HAROLD W. BUCK, OF NIAGARA FALLS, NEW YORK, ASSIGNOR TO GENERAL ELECTRIC COMPANY, A CORPORATION OF NEW YORK.

METHOD OF INDICATING THE RELATIVE POSITIONS OF MOVING PARTS.

SPECIFICATION forming part of Letters Patent No. 731,992, dated June 23, 1903.

Original application filed May 28, 1898, Serial No. 681,971. Divided and this application filed April 3, 1902. Serial No. 101,291. (No model.)

*To all whom it may concern:*

Be it known that I, HAROLD W. BUCK, a citizen of the United States, and a resident of Niagara Falls, county of Niagara, State of New York, have invented certain new and useful Improvements in Methods of Indicating the Relative Positions of Moving Parts, (division of my prior application, Serial No. 681,971, filed May 28, 1898,) of which the following is a specification.

When two direct-connected multipolar alternators are thrown together in parallel, they will not give satisfactory results in many cases unless the switch is thrown at the instant when the cranks of their respective driving-engines have the same angular position. This is particularly the case where two alternators are driven by independent single-cylinder engines. If at the time the switch is thrown the cranks of the engines happen to be crossed, one engine will pull while the other is near the dead-point, and conversely. If the fly-wheel effect of the engines happens to be small, the result is that the angular velocity of the engine-shafts will vary between certain links during a single revolution. If under these conditions the alternators driven by these engines be connected together at the instant when the speed of one engine happens to be accelerating and the other decreasing, the alternate transfer of load from one machine to the other will have the effect of exaggerating the irregular speed of the engines, and thus prevent the alternators from falling into step, even though the mean speed of the two engines be the same. The present invention enables this difficulty to be overcome by indicating when the cranks of the engines assume a relative position proper for connecting together the alternators driven thereby.

In the specific embodiment disclosed in this application the invention is arranged to indicate on the switchboard of the central station or at any other convenient place the instant at which the cranks of two steam-engines assume a predetermined relative angular position. Broadly speaking, however, the invention relates to a method of indicating the relative position of a plurality of parts each having a simple periodic motion. In its more limited aspects the invention is intended to indicate the relative angular positions of a plurality of shafts having substantially the same rate of rotation.

Figure 2:
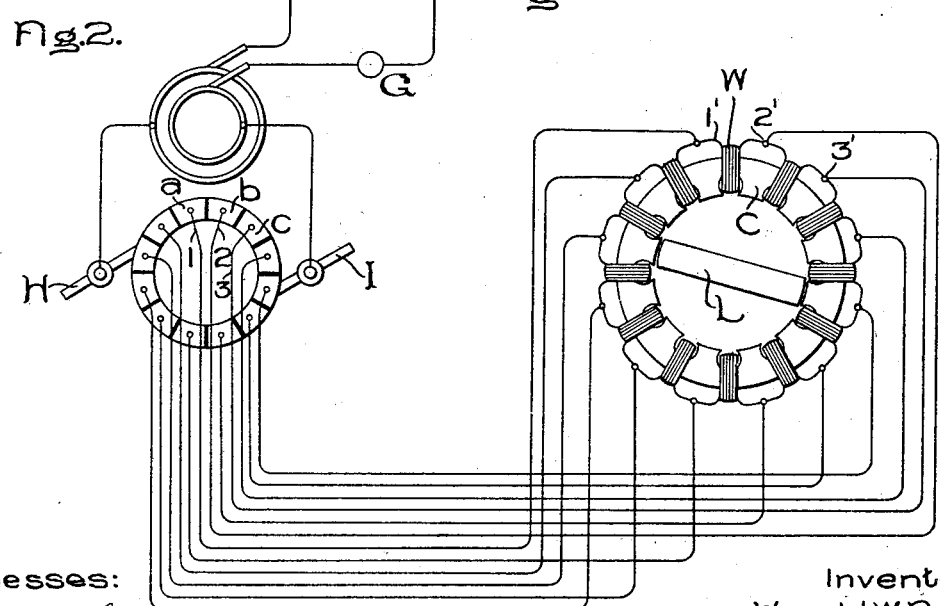

In the drawings, Figure 1 illustrates the arrangement of apparatus, and Fig. 2 is a diagram of circuits.

In Fig. 1 two alternating-current generators A and B are connected directly to driving-engines D and E. On the end of the shaft of the alternator A two collector-rings F connect through any suitable current-indicating device G with the mains or bus-bars $f\,g$ or with any other source of alternating current. This current-indicating device may be an incandescent lamp, for example. The shaft of the alternator A also carries two brushes H and I, connected, respectively, with the rings F. A commutator J is supported from a suitable standard K and arranged concentrically with the axis of the shaft of the alternator A and so that the brushes H and I can rotate about and bear thereon. To each commutator-bar is connected a wire, as shown in Fig. 2, the wire 1 being connected to the bar $a$, the wire 2 to the bar $b$, &c. All of the wires 1 2 3, &c., are bound together to form a cable which is connected by any suitable route to the closed winding W on the stationary ring C of magnetic material located concentrically with the axis of the shaft of the alternator B. The wires 1 2 3, &c., are connected to points equally spaced about the winding on the core or ring C. It will thus be seen by referring to Fig. 2 that the commutator-bar $a$ is connected to the point 1' in the closed winding, the bar $b$ to the point 2' in the winding, and so on. The number of commutator-segments is the same as the number of coils included between each pair of points 1' 2' 2' 3', and so on. The commutator-segments and the coils are thus spaced apart through the same angular distance.

The ring C is laminated, and rotating therein is a bar of magnetic material L, carried by the shaft of the alternator B.

As the brushes H and I rotate about the commutator J, it will be seen that the polarity of the winding of the ring C will rotate in correspondence with the rotation of the brushes. It will be apparent that the reactance of the winding depends upon the relative position of the bar L with respect to the line of polarity of the field produced by current in said winding. If the polar line and the bar L coincide in position, the reactance will be maximum, whereas if they are at right angles the reactance will be minimum. If the parts be so arranged that the cranks of the steam-engines have a desired predetermined relative position when this coincidence of the bar L and the polar line takes place, this relation may be observed by noting the current supplied to the winding W through the current-indicator G. Under these circumstances the current will be a minimum. If the current-indicator G is a lamp, it will go out when the engine-cranks assume the desired relation to each other. The switch M may then be turned, connecting the alternator B with the mains $f\,g$.

Instead of arranging the parts so that the indicator-current is a minimum when the moving parts have the desired predetermined relation it is of course evident that the arrangement might be such as to make the indicator-current a maximum or any other desired value.

What I claim as new, and desire to secure by Letters Patent of the United States, is—

1. The method of indicating the relative positions of a plurality of moving parts which consists in causing by one of said parts a progressive shifting of a magnetic field, and varying the value of said magnetic field through the agency of another moving part.

2. The method which consists in producing by an electric current a rotating magnetic field, and varying the value of said magnetic field by varying the angular relation between the polar line of the field and a body of magnetic material therein.

3. The method of indicating the relative position of two rotating parts which consists in producing a rotating field through the agency of one of said moving parts and varying the reluctance of the magnetic circuit of said field by the other rotating part and thereby correspondingly varying the current exciting said field, and indicating by the value of said current the relative positions of the moving parts.

4. The method of indicating the relative positions of a plurality of moving parts which consists in producing by an electric current a rotating magnetic field of the same frequency as that of one of said moving parts and varying the value of said current to correspond to the relative position of another of said moving parts.

In witness whereof I have hereunto set my hand this 25th day of March, 1902.

HAROLD W. BUCK.

Witnesses:
 WM. M. BLAIR,
 K. M. KELLEHER.